(12) United States Patent
Ito

(10) Patent No.: US 8,826,541 B2
(45) Date of Patent: Sep. 9, 2014

(54) METHOD FOR MANUFACTURING A FLUID BEARING DEVICE

(75) Inventor: Kenji Ito, Kuwana (JP)

(73) Assignee: NTN Corporation, Osaka-Fu (JP)

( * ) Notice: Subject to any disclaimer, the term of this patent is extended or adjusted under 35 U.S.C. 154(b) by 0 days.

(21) Appl. No.: 13/307,645

(22) Filed: Nov. 30, 2011

(65) Prior Publication Data

US 2012/0073138 A1     Mar. 29, 2012

Related U.S. Application Data

(63) Continuation of application No. 10/580,966, filed as application No. PCT/JP2004/019158 on Dec. 15, 2004, now abandoned.

(30) Foreign Application Priority Data

Dec. 24, 2003   (JP) ................. 2003-427433

(51) Int. Cl.
| | |
|---|---|
| *B21K 1/10* | (2006.01) |
| *H02K 5/167* | (2006.01) |
| *F16C 33/10* | (2006.01) |
| *F16C 35/02* | (2006.01) |
| *G11B 19/20* | (2006.01) |
| *F16C 17/10* | (2006.01) |

(52) U.S. Cl.
CPC .......... *G11B 19/2018* (2013.01); *H02K 5/1675* (2013.01); *F16C 33/1075* (2013.01); *F16C 33/107* (2013.01); *F16C 35/02* (2013.01); *F16C 2370/12* (2013.01); *F16C 17/107* (2013.01)
USPC ........ 29/898.02; 29/898; 29/898.11; 384/107

(58) Field of Classification Search
CPC ............ B21J 5/02; B21K 1/05; F16C 17/107; F16C 33/02; F16C 33/107; F16C 33/103; H02K 5/1675
USPC .......................... 29/898.02, 592.1, 596–598; 384/100–107, 112, 123, 276–279; 310/90, 67 R
See application file for complete search history.

(56) References Cited

U.S. PATENT DOCUMENTS

| | | |
|---|---|---|
| 6,412,984 B2 | 7/2002 | Asai et al. |
| 6,921,208 B2 | 7/2005 | Yamashita et al. |

(Continued)

FOREIGN PATENT DOCUMENTS

| | | |
|---|---|---|
| CN | 1453481 | 11/2003 |
| JP | 11-141550 | 5/1999 |

(Continued)

*Primary Examiner* — Minh Trinh
(74) *Attorney, Agent, or Firm* — Wenderoth, Lind & Ponack, L.L.P.

(57) ABSTRACT

A fluid bearing device is manufactured with a high adhesive strength in fixing another member by adhesion to a resin housing. A bearing sleeve is secured in position inside the resin housing, and a shaft member is radially supported in a non-contact fashion by a dynamic pressure action of lubricant generated in a radial bearing clearance between the shaft member and the bearing sleeve. A metal bracket for mounting the stator coil of a motor is fixed by adhesion to the outer periphery of the housing, in which the adhesion portion of the outer periphery of the housing to be fixed to the bracket is roughened, setting the surface roughness to 0.5 μmRa to 2.0 μmRa.

24 Claims, 6 Drawing Sheets

(56) References Cited

U.S. PATENT DOCUMENTS

| | | |
|---|---|---|
| 7,025,505 B2 | 4/2006 | Komori et al. |
| 7,650,697 B2 * | 1/2010 | Gomyo et al. ............. 29/898.02 |
| 7,690,845 B2 * | 4/2010 | Satoji et al. .................. 384/100 |
| 7,798,721 B2 * | 9/2010 | Shibahara et al. ............ 384/107 |
| 2003/0169952 A1 * | 9/2003 | Yamashita et al. ........... 384/107 |
| 2004/0017954 A1 | 1/2004 | Komori et al. |
| 2007/0177831 A1 * | 8/2007 | Shibahara ..................... 384/107 |
| 2012/0073138 A1 * | 3/2012 | Ito .............................. 29/898.02 |

FOREIGN PATENT DOCUMENTS

| | | |
|---|---|---|
| JP | 2002-286028 | 10/2002 |
| JP | 2002-302562 | 10/2002 |
| JP | 2003-314538 | 11/2003 |
| JP | 2003-314555 | 11/2003 |

* cited by examiner

METHOD FOR MANUFACTURING A FLUID BEARING DEVICE

CROSS-REFERENCE TO RELATED APPLICATION

This application is a Continuation of U.S. application Ser. No. 10/580,966, filed May 31, 2006, now abandoned, which is a national stage application of International application No. PCT/JP2004/019158, filed Dec. 15, 2004.

BACKGROUND OF THE INVENTION

1. Field of the Invention

The present invention relates to a fluid bearing device. This fluid bearing device is suitable for use as a bearing device in the spindle motor of an information apparatus, for example, a magnetic disc apparatus, such as an HDD or an FDD, an optical disc apparatus, such as a CD-ROM, a CD-R/RW, or a DVD-ROM/RAM, or a magneto-optical disc apparatus, such as an MD or an MO, the polygon scanner motor of a laser beam printer (LBP), a color wheel for a projector, or the small motor of an electric apparatus, such as an axial flow fan.

2. Related Background Art

Apart from high rotational accuracy, an improvement in speed, a reduction in cost, a reduction in noise, etc. are required of the motors as mentioned above. One of the factors determining such requisite performances is the bearing supporting the spindle of the motor. Recently, as such a kind of bearing, use of a dynamic pressure bearing superior in the above requisite performances is being considered or such a fluid bearing has been actually put into practical use. This type of fluid bearing is roughly classified into two categories: a dynamic pressure bearing equipped with a dynamic pressure generating means for generating dynamic pressure in a lubricant in a bearing clearance, and a circular bearing equipped with no such dynamic pressure generating means (a bearing whose bearing surface is of a circular configuration).

As an example of such a bearing device, JP 2000-291648 A discloses a dynamic pressure bearing device for use in the spindle motor of a disc drive apparatus, such as an HDD. In this bearing device, a bearing sleeve is fixed to the inner periphery of a housing formed as a bottomed cylinder, and a shaft member with a flange portion protruding radially outwards is inserted into the bore defined by the inner periphery of the bearing sleeve, wherein a fluid dynamic pressure is generated in a radial bearing clearance and a thrust bearing clearance formed between the rotating shaft member and the stationary members (the bearing sleeve, the housing, etc.), the shaft member being supported in a non-contact fashion by this fluid dynamic pressure.

Incidentally, a spindle motor of this type rotates a shaft member by an excitation force generated by a rotor magnet and a stator coil; conventionally, the rotor magnet is, in many cases, fixed to a member rotating with the shaft member (a disc hub or the like), whereas the stator coil is fixed to a metal bracket (a motor bracket) fixed to the outer periphery of the housing of a dynamic pressure bearing device.

The fixation of the motor bracket and the housing is generally effected by adhesion. Conventionally, the housing has been formed of a soft metal, such as brass; since the adhesion is effected between metal members, it has been possible to obtain a necessary and sufficient adhesive force.

Recently, however, use of a resin housing is being considered from the viewpoint of achieving a reduction in cost, etc. In this case, it is impossible to obtain a sufficient adhesive force for the connection between the resin housing and the motor bracket. Thus, what matters here is how to attain a sufficient adhesive force for the connection therebetween.

SUMMARY OF THE INVENTION

In view of this, it is an object of the present invention to achieve an enhancement in the adhesive strength for the connection between a resin housing and another member, such as a motor bracket.

In order to achieve this object, a fluid bearing device according to the present invention includes: a housing; a bearing sleeve secured in position inside the housing; a shaft member adapted to rotate relative to the bearing sleeve; and a radial bearing portion supporting the shaft member radially in a non-contact fashion with an oil film formed generated in a radial bearing clearance between an inner peripheral surface of the bearing sleeve and an outer peripheral surface of the shaft member, with another member being fixed by adhesion to the housing, in which at least the housing is formed of resin, and in which, of the housing and the other member, an adhesion portion of the one formed of resin has a surface roughness of 0.5 μmRa or more.

Usually, a resin product is formed by injection molding. The molding surface of the mold for injection molding is mirror-finished, so that the surface roughness of the resin product obtained is approximately 0.1 μmRa, which is markedly lower than that of a metal product. By intentionally roughening the surface of the adhesion portion of a resin product thus obtained by injection molding to 0.5 μmRa or more, when connecting the housing and the other member by adhesion, adhesive enters the voids defined by the surface protrusions and recesses resulting from the surface roughening to thereby provide an anchoring effect, so that it is possible to ensure a high adhesion strength. This helps to ensure a high anti-impact property between the resin housing and the member to be connected therewith, so that it is possible to form the housing of resin and to provide a fluid bearing device superior in durability and reliability. Apart from the adhesion portion of the housing (the portion of the housing to be connected to some other member by adhesion), such surface roughening can also be effected on the adhesion portion of the other member (the portion of the other member to be connected to the housing by adhesion) when the other member is formed of resin.

On the other hand, when the adhesion portion is roughened to an excessive degree, a deterioration in the releasability of the molded product results at the time of molding. In view of this, it is desirable for the surface roughness of the adhesion portion to be not more than 2.0 μmRa, more preferably, not more than 1.5 μmRa.

There are no particular limitations regarding the kind of resin of which the housing is to be formed as long as it is a thermoplastic resin. Examples of the resin that can be used include amorphous resins, such as polysulfone (PSF), polyether sulfone (PES), polyphenyl sulfone (PPSF), and polyether imide (PEI), and crystalline resins, such as liquid crystal polymer (LCP), polyetheretherketone (PEEK), polybutyrene terephthalate (PBT), and polyphenylene sulfide (PPS).

It is also possible to add filler to the above-mentioned resins as needed. There are no particular limitations regarding the kind of filler used. Examples of the filler that can be used include a fibrous filler such as glass fiber, a whisker-like filler such as potassium titanate, a scaly filler such as mica, and a fibrous or powder-like conductive filler such as carbon fiber, carbon black, graphite, carbon nanomaterial, and metal powder. Such filler may be used singly, or two or more kinds of filler may be mixed with each other.

There are no particular limitations regarding the function, structure, configuration, etc. of the other member to be connected with the housing by adhesion, and its material may be metal or one of the resin materials as mentioned above. Apart from the outer peripheral surface of the housing, this other member may be connected by adhesion to various parts of the housing, such as the inner peripheral surface or the bottom portion thereof. Instead of performing it on the adhesion portion alone, it is also possible to perform the surface roughening on the entire surface of the member including the adhesion portion.

There are no particular limitations regarding the adhesive used for the connection by adhesion of the housing and the other member; it is selected from among various types of adhesive, including epoxy type adhesives, urethane type adhesives, acrylic type adhesives, etc. according to the resin material used and the kind of material of the other member to be connected thereto by adhesion.

Examples of the other member to be connected to the housing by adhesion include a bracket for mounting a stator coil, a sealing member for hermetically sealing an opening of the housing, a thrust bush for closing the bottom portion of the housing, and a bearing sleeve.

Since it uses a resin housing, a motor having a dynamic pressure bearing device as described above, a stator coil, and a rotor magnet is inexpensive. Further, since a sufficient level of adhesive strength is ensured, the motor exhibits high impact resistance and is superior in durability and reliability.

According to the present invention, it is possible to ensure a strong adhesive force for the connection by adhesion between the resin housing and the other member, making it possible to improve the fluid bearing device in terms of durability and reliability.

DESCRIPTION OF THE PREFERRED EMBODIMENTS

In the following, embodiments of the present invention will be described with reference to FIGS. 1 through 7.

Figures 1, 2:
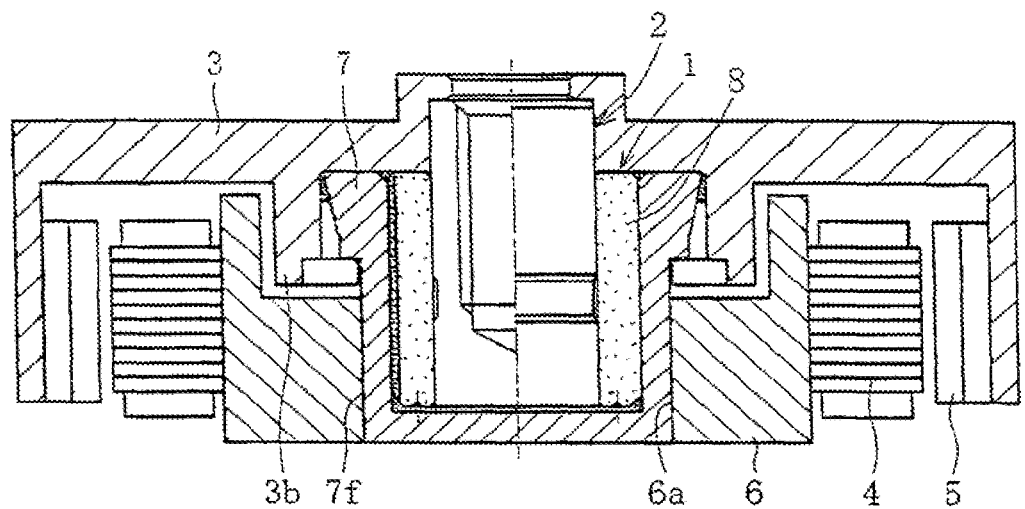
FIG. 1 is a sectional view of a spindle motor for an information apparatus with a dynamic pressure bearing incorporated therein.
FIG. 2 is a sectional view of the dynamic pressure bearing.

FIG. 1 conceptually shows an example of the construction of a spindle motor for an information apparatus with a dynamic pressure bearing device 1, supporting a shaft member 2 with a dynamic pressure oil film, incorporated therein. This spindle motor is used in a disc drive device, such as an HDD, and contains the dynamic pressure bearing device 1, a disc hub 3 mounted to a shaft member 2, and a stator coil 4 and a rotor magnet 5 that are opposed to each other through the intermediation, for example, of a radial gap. The stator coil 4 is mounted to the outer periphery of a bracket 6, and the rotor magnet 5 is mounted to the inner periphery of the disc hub 3. As described below, the dynamic pressure bearing 1 has a housing 7 fixed by adhesion to the inner periphery of the bracket 6. The disc hub 3 retains one or a plurality of discs D, such as magnetic discs (see FIG. 5). When the stator coil 4 is energized, the rotor magnet 5 is rotated by an electromagnetic force between the stator coil 4 and the rotor magnet 5, whereby the disc hub 3 and the shaft member 2 constitute rotary members to rotate integrally.

FIG. 2 is an enlarged view of the dynamic pressure bearing device 1. This dynamic pressure bearing device 1 consists of as main components the housing 7 formed as a bottomed cylinder with one end open, a bearing sleeve 8 fixed to the inner periphery of the housing 7, and the shaft member 2.

In this dynamic pressure bearing 1, there are provided, between the inner peripheral surface 8a of the bearing sleeve 8 and the outer peripheral surface 2a of the shaft member 2, a first radial bearing portion R1 and a second radial bearing portion R2 axially spaced apart from each other. Further, a thrust bearing portion T1 is formed between the upper end surface 7d of the housing 7 and the opposing lower end surface 3a of the disc hub (rotor) 3 fixed to the shaft member 2. In the following description, for the sake of convenience, the bottom portion 7b side of the housing 7 will be referred to as the lower side, and the side opposite to the bottom portion 7b will be referred to as the upper side.

Figure 9:
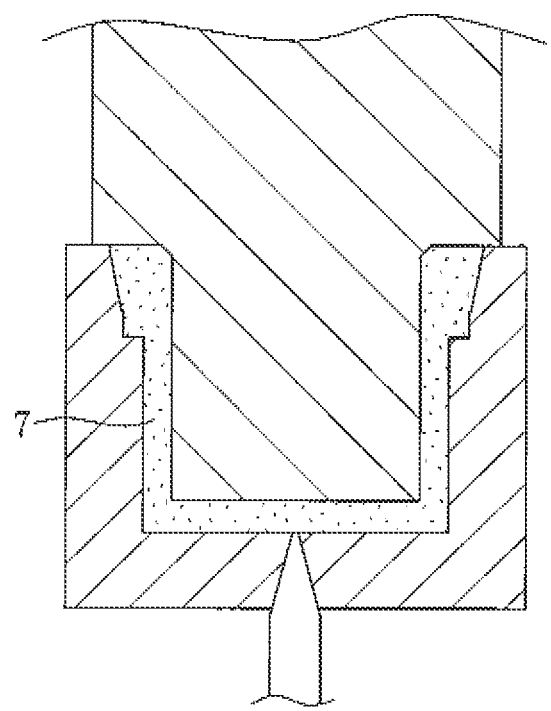
FIG. 9 is a diagram showing the forming of a housing by a molding process using a mold.

The housing 7 is formed as a bottomed cylinder by injection molding of a resin material consisting, for example, of liquid crystal polymer (LCP) as a crystalline resin with 2 to 8 wt % of carbon nanotube as a conductive filler added thereto, and is equipped with a cylindrical side portion 7a and the bottom portion 7b formed integrally at the lower end of the side portion 7a. FIG. 9 shows an example of the formation of the housing 7 by a molding process using a mold.

Figure 4:
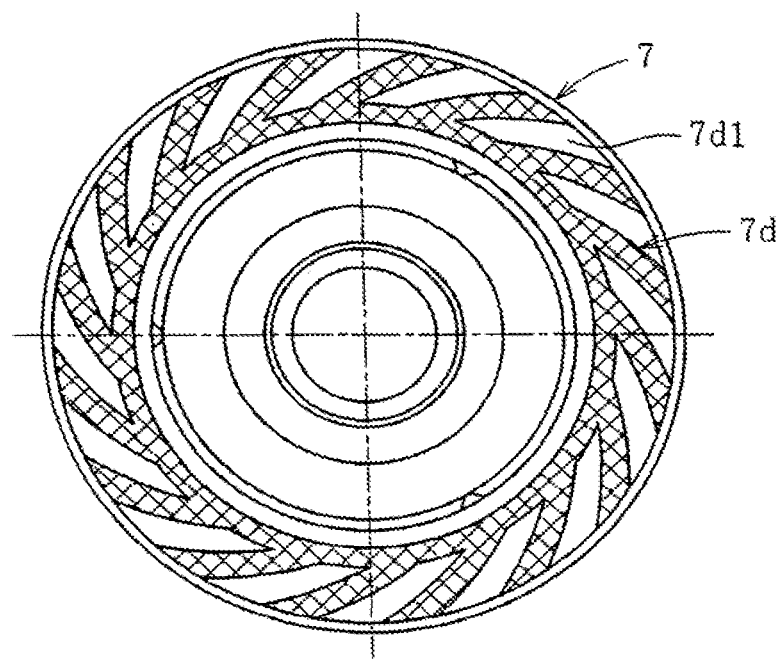
FIG. 4 is a plan view of the housing as seen from the direction of the arrow B in FIG. 2.

As shown in FIG. 4, dynamic pressure grooves 7d1 of, for example, a spiral configuration, are formed in the upper end surface 7d constituting the thrust bearing surface of the thrust bearing portion T1. These dynamic pressure grooves 7d1 are formed at the time of formation of the housing 7 by injection molding. That is, at the pertinent position of the mold for forming the housing 7 (the position where the upper end surface 7d is to be formed), there is previously prepared by machining a groove pattern for forming the dynamic pressure grooves 7d1, and, at the time of formation of the housing 7 by injection molding, the shape of the groove pattern is transferred to the upper end surface 7d of the housing 7, whereby it is possible to form the dynamic pressure grooves 7d1 simultaneously with the formation of the housing 7 by molding.

Further, the housing 7 has, in the outer periphery of the upper portion thereof, a tapered outer wall 7e gradually diverging upwards. Between this tapered outer wall 7e and an inner wall 3b1 of a flange portion 3b provided on the disc hub 3, there is formed a tapered sealing space S gradually diminishing upwards. During rotation of the shaft member 2 and the disc hub 3, this sealing space S communicates with the outer side of the thrust bearing clearance of the thrust bearing portion T1.

The shaft member 2 is formed as a shaft with a uniform diameter of a metal material, such as stainless steel. The disc hub 3 is fixed to the shaft member 2 by thread engagement as shown in the drawing, or some other appropriate means, such as press-fitting or adhesion.

The bearing sleeve 8 is formed in a cylindrical configuration using a porous material consisting of, for example, a sintered metal, in particular, a sintered metal whose main component is copper, and is fixed to a predetermined position of the inner peripheral surface 7c of the housing 7 by, for example, adhesion or ultrasonic welding.

Figure 3:
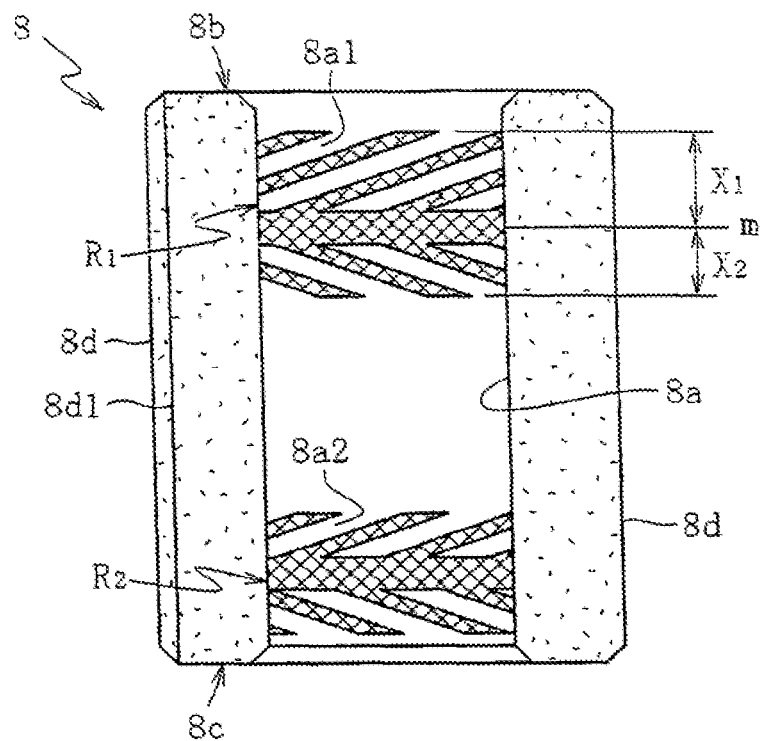
FIG. 3 is a sectional view of a bearing sleeve to be used in the dynamic pressure bearing device.

On the inner peripheral surface 8a of the bearing sleeve 8, formed of a sintered metal, there are provided upper and lower areas constituting the radial bearing surfaces of the first radial bearing portion R1 and the second radial bearing portion R2 so as to be axially spaced apart from each other, and, in these two areas, there are respectively formed dynamic pressure grooves 8a1 and 8a2 of a herringbone-like configuration (or a spiral configuration) as shown, for example, in FIG. 3. In the radial bearing portions R1 and R2 shown, the upper dynamic pressure grooves 8a1 are formed axially asymmetrical with respect to the axial center m (the axial center of the region between the upper and lower inclined grooves), and the axial dimension X1 of the region above the axial center m is larger than the axial dimension X2 of the region below the same. Further, on the outer peripheral surface 8d of the bearing sleeve 8, there is formed one or a plurality of axial grooves 8d1 so as to extend over the entire axial length thereof.

The shaft member 2 is inserted into the bore defined by the inner peripheral surface 8a of the bearing sleeve 8. When the shaft member 2 and the disc hub 3 are at rest, there respectively exist minute gaps between the lower end surface 2b of the shaft member 2 and the inner bottom surface 7b1 of the housing 7 and between the lower end surface 8c of the bearing sleeve 8 and the inner bottom surface 7b1 of the housing 7.

The inner space, etc. of the housing 7 are filled with lubricant. That is, inclusive of the inner pores of the bearing sleeve 8, the lubricant fills the clearance between the inner peripheral surface 8a of the bearing sleeve 8 and the outer peripheral surface 2a of the shaft member 2, the clearance between the lower end surface 8c of the bearing sleeve 8 and the lower end surface 2b of the shaft member 2 and the inner bottom surface 7b1 of the housing 7, the axial grooves 8d1 of the bearing sleeve 8, the clearance between the upper end surface 8b of the bearing sleeve 8 and the lower end surface 3a of the disc hub 3, the thrust bearing portion T1, and the sealing space S.

During rotation of the shaft member 2 and the disc hub 3, the (upper and lower) areas of the inner peripheral surface 8a of the bearing sleeve 8 constituting the radial bearing surfaces are opposed to the outer peripheral surface 2a of the shaft member 2 respectively through the intermediation of the radial bearing clearances. The area of the upper end surface 7d of the housing 7 constituting the thrust bearing surface is opposed to the lower end surface 3a of the disc hub 3 through the intermediation of the thrust bearing clearance. As the shaft member 2 and the disc hub 3 rotate, a dynamic pressure of lubricant is generated in the radial bearing clearances, and the shaft member 2 is supported radially and rotatably in a non-contact fashion by oil films formed within the radial bearing clearances. As a result, there are formed the first radial bearing portion R1 and the second radial bearing portion R2 supporting the shaft member 2 and the disc hub 3 radially and rotatably in a non-contact fashion. At the same time, a dynamic pressure of lubricant is generated in the thrust bearing clearance, and the disc hub 3 is rotatably supported in the thrust direction in a non-contact fashion by an oil film formed within the thrust bearing clearance, whereby there is formed the thrust bearing portion T1 supporting the shaft member 2 and the disc hub 3 rotatably in the thrust direction in a non-contact fashion.

As shown in FIG. 1, a bracket 6 formed of metal, preferably a light alloy, such as aluminum alloy, is fixed by adhesion to the outer peripheral surface 7f of the side portion 7a of the housing 7. After the adhesion, the outer peripheral surface 7f of the housing 7 (exclusive of the tapered outer wall 7e) and the inner peripheral surface 6a of the bracket 6 are firmly connected to each other by the adhesion filling the adhesion gap.

In the present invention, to ensure the requisite adhesive strength for the housing 7 and the bracket 6, the surface of the housing 7 is formed as a surface (a roughened surface) having a center line average roughness of 0.5 μmRa or more as defined in JIS B0601. An examination by the inventor of the present invention showed that a surface roughness less than 0.5 μmRa does not provide a sufficient adhesive strength. As far as only adhesive strength is concerned, there is no need to particularly set an upper limit to the surface roughness; however, when the surface roughness is in excess of 2.0 μmRa, it is rather difficult to release the molded product from the mold after injection molding, thus obstructing successive molding. Thus, it is desirable for the surface roughness of the adhesion portion to be not less than 0.5 μmRa but not more than 2.0 μmRa (preferably not more than 1.5 μmRa). It is not always necessary for the entire surface of the housing 7 to be within the above-mentioned surface roughness range; it suffices if at least the surface roughness of the adhesion portion of the bracket 6 is within the above-mentioned range. When fixing the bearing sleeve 8 by adhesion to the inner peripheral surface 7c of the housing 7, a similar effect can be obtained by forming the adhesion portion of the housing inner peripheral surface 7c as a roughened surface as described above.

The surface roughening of the adhesion portion of the housing 7 can be effected at low cost by, for example, performing injection molding after roughening the mirror-finished molding surface of the mold by shot blasting, sand paper or the like. For instance, by roughening the molding surface of the mold to approximately 1.0 μmRa, it is possible to achieve a surface roughness of 0.8 μmRa in the resultant product obtained by molding. Apart from such previous surface roughening of the mold, it is also possible to form the surface of the adhesion portion as a roughened surface by performing an appropriate surface roughening processing on the housing surface after the injection molding.

Figure 5:
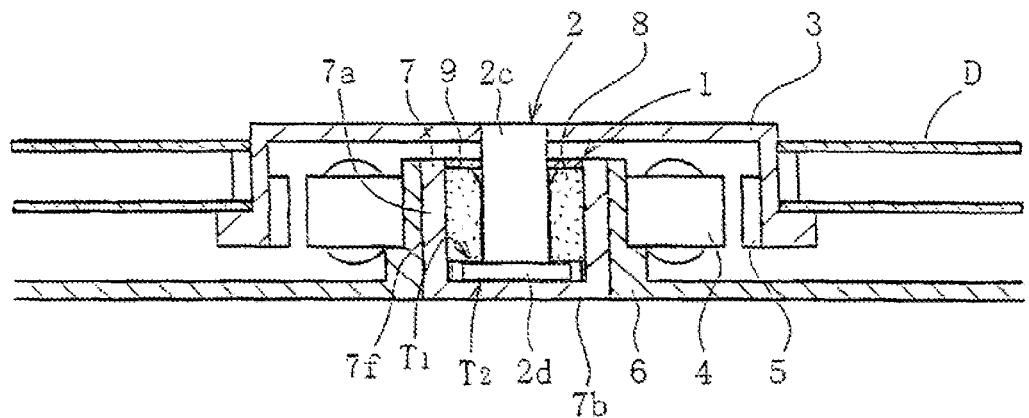
FIG. 5 is a sectional view of a spindle motor for an information apparatus with a dynamic pressure bearing according to another embodiment incorporated therein.

The present invention is not restricted to the dynamic pressure bearing device as shown in FIGS. 1 and 2 by way of example; as long as the housing 7 is formed of resin, the present invention is applicable to various types of dynamic pressure bearing device. FIG. 5 shows an example thereof, in which the shaft member 2 is composed of a shaft portion 2c and an outwardly protruding flange portion 2d; a thrust bearing surface is formed on either one end surface of the flange portion 2d or the end surface of the bearing sleeve 8 opposed thereto, and on either the other end surface of the flange portion 2d or the bottom portion 7b of the housing 7 opposed thereto, whereby there are formed a first thrust bearing portion T1 and a second thrust bearing portion T2 vertically spaced apart from each other (The radial bearing portions R1 and R2 are not shown). In this embodiment also, the outer peripheral surface 7f of the resin housing 7 is fixed by adhesion to the inner peripheral surface of the bracket 6; by roughening the outer peripheral surface 7f of the housing 7 prior to adhesion as described above, it is possible to obtain a high adhesive strength for the connection between the housing 7 and the bracket 6. In this dynamic pressure bearing device 1, a sealing member 9 sealing the opening at the upper end of the housing 7 can be fixed by adhesion to the inner peripheral surface of the housing 7. In this case, the portion of the inner peripheral surface of the housing 7 connected to at least the sealing member 9 may be roughened in a manner as described above.

Figure 6:
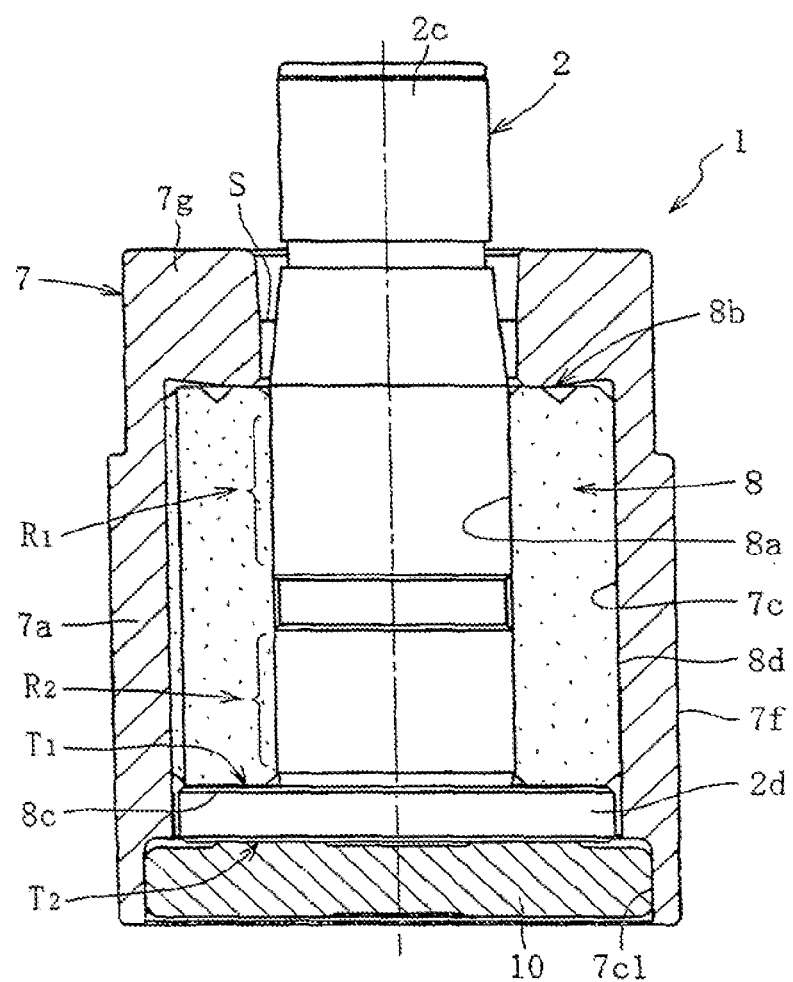
FIG. 6 is a sectional view of a dynamic pressure bearing device according to another embodiment of the present invention.

FIG. 6 shows an example in which, in the dynamic pressure bearing device shown in FIG. 5, the bottom portion 7b of the resin housing 7 is formed by a thrust bush 10, which is a separate component. In this case, the thrust bush 10 is fixed by adhesion to a large-diameter inner peripheral surface 7c1 formed in the inner periphery of the housing 7; by roughening this large-diameter inner peripheral surface 7c1 in a manner as described above, it is possible to achieve a high adhesive strength. While, in the example shown, a sealing portion 7g is integrally formed at the upper end of the housing, it is also possible for this sealing portion 7g to be formed as a separate sealing member 9 (see FIG. 5), fixing it by adhesion to the inner periphery of the housing 7 roughened beforehand.

In the above-described examples the adhesion portion of the housing 7 is subjected to surface roughening; however, when the member to which the housing 7 is to be fixed (e.g., the bracket 6, the bearing sleeve 8, the sealing member 9, or the thrust bush 10) is formed of resin, it is also possible for the adhesion portion of that member to be subjected to surface roughening.

Further, while in the above embodiments the thrust bearing portions T1 and T2 are both formed as dynamic pressure bearings, the present invention is also applicable to a case in which these thrust bearing portions are formed as contact type pivot bearings.

Figure 8A:
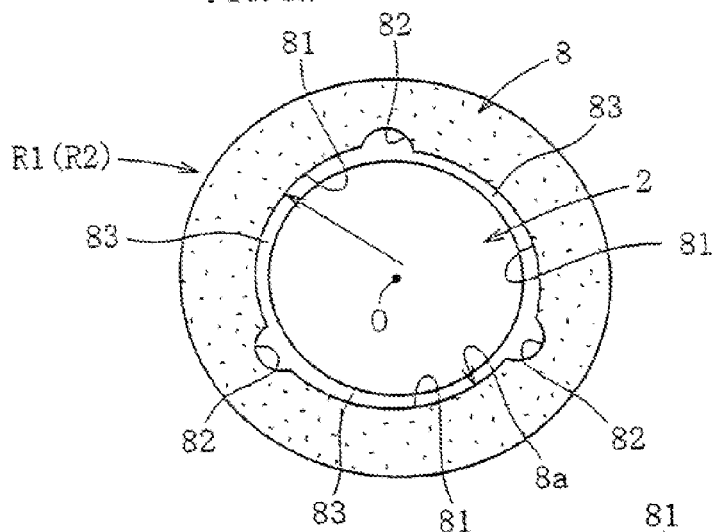
FIG. 8 is a sectional view of a radial bearing portion in a fluid bearing device according to another embodiment of the present invention.

The radial bearing portions R1 and R2 can also be formed by multi-arc bearings. FIG. 8A shows an example thereof, in which a plurality of arcuate surfaces 81 are formed in the areas of the inner peripheral surface 8a of the bearing sleeve 8 constituting the respective radial bearing surfaces of the first radial bearing portion R1 and the second radial bearing portion R2 (also referred to as the "tapered bearings"). The arcuate surfaces 81 are eccentric arcuate surfaces whose centers are offset from the rotation axis O by the same distance, and are formed at equal intervals in the circumferential direction. Between the eccentric arcuate surfaces 81, there are formed axial separation grooves 82.

By inserting the shaft member 2 into the bore defined by the inner peripheral surface 8a of the bearing sleeve 8, the radial bearing clearances of the first and second radial bearing portions R1 and R2 are formed between the eccentric arcuate surfaces 81 and separation grooves 82 of the bearing sleeve 8 and the circular outer peripheral surface 2a of the shaft member 2. Of the radial bearing clearances, the areas opposed to the eccentric arcuate surfaces constitute wedge-like clearances 83 gradually reduced in clearance width in one circumferential direction. The width-reducing direction of the wedge-like clearances 83 coincides with the rotating direction of the shaft member 2.

Figure 8B:
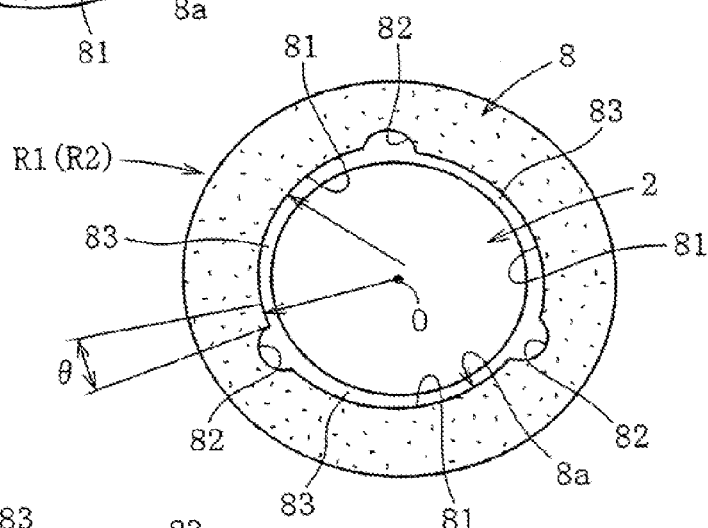
Figure 8C:
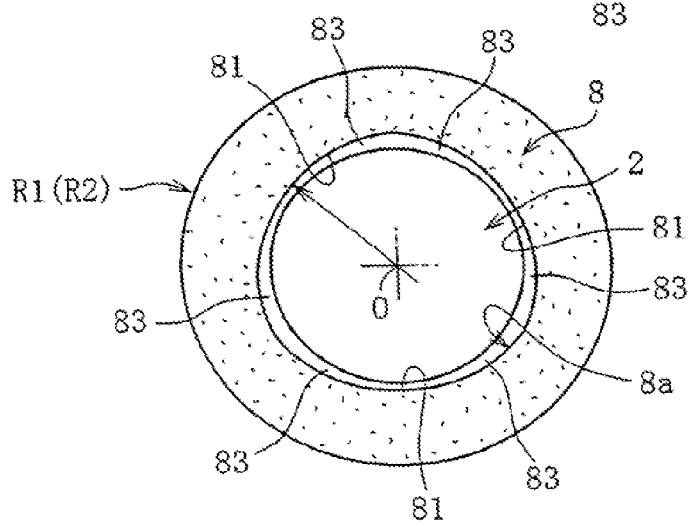

FIGS. 8B and 8C show other embodiments of the multi-arc bearings forming the first and second radial bearing portions R1 and R2.

Of these, in the embodiment shown in FIG. 8B, the construction shown in FIG. 8A is modified such that predetermined areas θ on the minimum clearance side of the eccentric arcuate surfaces 81 are formed by concentric arcs which have the rotation axis O as their centers. Thus, in each predetermined area θ, the radial bearing clearance (minimum clearance) is fixed. A multi-arc bearing thus constructed is also referred to as a tapered flat bearing.

In FIG. 8C, the areas of the inner peripheral surface 8a of the bearing sleeve 8 constituting the radial bearing surfaces are formed by three arcuate surfaces 81, with the centers of the three arcuate surfaces 81 being offset by the same distance from the rotation axis O. In each of the areas defined by the three eccentric arcuate surfaces 81, the radial bearing clearance is configured so as to be gradually diminished in both circumferential directions.

While the multi-arc bearings of the first and second radial bearing portions R1 and R2 described above are all three-arc bearings, this should not be construed restrictively; it is also possible to adopt a so-called four-arc bearing, five-arc bearing, or, further, a multi-arc bearing with six arcs or more. Further, apart from the construction in which two radial bearing portions are axially spaced apart from each other as in the case of the radial bearing portions R1 and R2, it is also possible to adopt a construction in which a single radial bearing portion is provided so as to extend over the upper and lower areas of the inner peripheral surface of the bearing sleeve 8.

Further, while in the above embodiment multi-arc bearings are adopted as the radial bearing portions R1 and R2, it is also possible to adopt a bearing of some other type. For example, although not shown, it is also possible to use, in the area of the inner peripheral surface 8a of the bearing sleeve 8 constituting the radial bearing surface, a step bearing in which there are formed dynamic pressure grooves in the form of a plurality of axial grooves.

Figure 7:
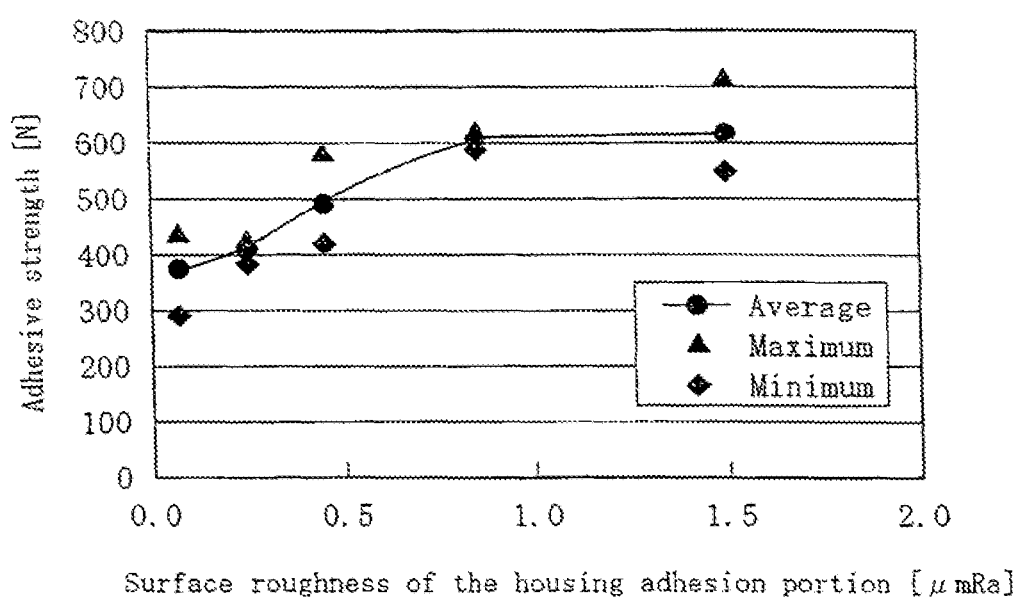
FIG. 7 is a diagram showing test results obtained through measurement, showing the relationship between the surface roughness of the housing adhesion portion and the adhesive strength.

FIG. 7 shows test results obtained through measurement, indicating the relationship between the surface roughness of the housing adhesion portion and the adhesive strength. In this test, the housing 7 used was one having a separate thrust bush 10 at the bottom (see FIG. 6), and the extraction load of the thrust bush 10 was measured by gradually increasing the load in the thrust direction applied to the thrust bush 10. The adhesive used was an epoxy type adhesive (Epotec 353ND manufactured by Epoxy Technology, Co.).

As is apparent from FIG. 7, in an ordinary injection-molding product which had undergone no surface roughening (0.1 μmRa), the adhesive strength was 400 N, whereas, by effecting surface roughening on the adhesion portion to 0.5 μmRa, the adhesive strength was enhanced by approximately 25% to become 500 N, thus satisfying the impact load level (1000 G) required of a dynamic pressure bearing device. At a surface roughness of 1.0 μmRa, the adhesive strength was 600 N, thus making it clear that a surface roughness in excess of this would result in the adhesive strength reaching a level of saturation. On the other hand, as stated above, at a surface roughness in excess of 2.0 μmRa, the releasability in the injection molding deteriorates. Thus, as can also be seen from the test results, it is desirable for the surface roughness of the adhesion portion to be 0.5 μmRa or more. On the other hand, it is desirable for the upper limit of the surface roughness to be 2.0 μmRa or less, preferably, 1.5 μmRa or less.

It should be noted that when, as described above, the bearing sleeve 8 is formed of an oil-impregnated sintered metal, vacuum impregnation with lubricant is often effected. This vacuum impregnation is effected by incorporating the bearing sleeve 8 into the housing 7 and immersing the whole in oil; conventionally, even if degreasing is effected on the housing 7 after such immersion in oil, it has been impossible, in many cases, to obtain a sufficient adhesive strength in the subsequent step of connecting the other member by adhesion. In the present invention, in contrast, it is possible to obtain a high adhesive strength even after such immersion in oil. This proves the present invention to be especially suitable for a bearing device in which the bearing sleeve 8 is formed of an oil-impregnated sintered metal.

What is claimed is:

1. A method for manufacturing a fluid bearing device, the fluid bearing device including a housing, a bearing sleeve having an inner peripheral surface, a shaft member having an outer peripheral surface, and being arranged to rotate relative to the bearing sleeve, a radial bearing portion supporting the shaft member radially in a non-contact fashion with an oil film formed in a radial bearing clearance between the inner peripheral surface of the bearing sleeve and the outer peripheral surface of the shaft member, and a second member, said method comprising:

provdiing a smooth surface and a roughened surface at a molding surface of a mold;

forming the housing by a molding process using the mold;

releasing an adhesion portion of the housing molded by the roughened molding surface of the mold from the roughened molding surface of the mold after the forming of the housing by the molding process;

forming the second member of metal;

securing the bearing sleeve in position inside the housing; and fixing the second member by adhesion to the adhesion portion of the housing, wherein the adhesion portion of the housing has a surface roughness of 0.5 μmRa or more.

2. A method according to claim 1, wherein the surface roughness of the adhesion portion is between 0.5 μmRa and 2.0 μmRa.

3. A method according to claim 2, wherein the second member is a bracket for mounting a stator coil of a motor.

4. A method according to claim 2, wherein the second member is a sealing member for sealing up an opening of the housing.

5. A method for manufacturing a motor, said method comprising manufacturing a fluid bearing device as claimed in claim 4; supplying a stator coil; and supplying a rotor magnet.

6. A method according to claim 2, wherein the second member is a thrust bush closing a bottom portion of the housing.

7. A method for manufacturing a motor, said method comprising manufacturing a fluid bearing device as claimed in claim 6; supplying a stator coil; and supplying a rotor magnet.

8. A method according to claim 2, wherein the second member fixed is the bearing sleeve.

9. A method for manufacturing a motor, said method comprising manufacturing a fluid bearing device as claimed in claim 8; supplying a stator coil; and supplying a rotor magnet.

10. A method for manufacturing a motor, said method comprising manufacturing a fluid bearing device as claimed in claim 2; supplying a stator coil; and supplying a rotor magnet.

11. A method according to claim 1, wherein the second member is a bracket for mounting a stator coil of a motor.

12. A method for manufacturing a motor, said method comprising manufacturing a fluid bearing device as claimed in claim 11; supplying a stator coil; and supplying a rotor magnet.

13. A method according to claim 11, further comprising fixing the bracket to an outer peripheral surface of a side portion of the housing.

14. A method according to claim 1, wherein the second member is a sealing member for sealing up an opening of the housing.

15. A method for manufacturing a motor, said method comprising manufacturing a fluid bearing device as claimed in claim 14; supplying a stator coil; and supplying a rotor magnet.

16. A method according to claim 14, further comprising fixing the sealing member to an inner peripheral surface the housing.

17. A method according to claim 1, wherein the second member is a thrust bush closing a bottom portion of the housing.

18. A method for manufacturing a motor, said method comprising manufacturing a fluid bearing device as claimed in claim 17; supplying a stator coil; and supplying a rotor magnet.

19. A method according to claim 17, further comprising fixing the thrust bush to an inner peripheral surface of the housing.

20. A method according to claim 1, wherein the second member is the bearing sleeve.

21. A method for manufacturing a motor, said method comprising manufacturing a fluid bearing device as claimed in claim 20; supplying a stator coil; and supplying a rotor magnet.

22. A method according to claim 20, wherein an adhesion gap is between the adhesion portion of the housing and the second member, and the adhesion fills in the adhesion gap.

23. A method for manufacturing a motor, said method comprising manufacturing a fluid bearing device as claimed in claim 1; supplying a stator coil; and supplying a rotor magnet.

24. A method for manufacturing a motor, said method comprising manufacturing a fluid bearing device as claimed in claim 3; supplying a stator coil; and supplying a rotor magnet.

* * * * *